United States Patent
Clark

(10) Patent No.: US 9,302,857 B2
(45) Date of Patent: Apr. 5, 2016

(54) PNEUMATIC SOLIDS TRANSFER PUMP

(71) Applicant: Nordson Corporation, Westlake, OH (US)

(72) Inventor: Justin A. Clark, Sugar Hill, GA (US)

(73) Assignee: NORDSON CORPORATION, Westlake, OH (US)

(*) Notice: Subject to any disclaimer, the term of this patent is extended or adjusted under 35 U.S.C. 154(b) by 31 days.

(21) Appl. No.: 13/790,142

(22) Filed: Mar. 8, 2013

(65) Prior Publication Data

US 2013/0287503 A1    Oct. 31, 2013

Related U.S. Application Data

(60) Provisional application No. 61/637,986, filed on Apr. 25, 2012.

(51) Int. Cl.
*B65G 53/50* (2006.01)
*B65G 53/10* (2006.01)
*B05C 11/10* (2006.01)

(52) U.S. Cl.
CPC ............ *B65G 53/10* (2013.01); *B05C 11/10* (2013.01); *B05C 11/1042* (2013.01)

(58) Field of Classification Search
USPC ............... 406/92, 93, 144, 195; 222/195, 630
See application file for complete search history.

(56) References Cited

U.S. PATENT DOCUMENTS

| 1,908,220 | A | * | 5/1933 | Chapman | 406/92 |
| 2,744,792 | A | | 5/1956 | Finn | |
| 3,186,768 | A | | 6/1965 | Pendelton | |
| 3,194,539 | A | * | 7/1965 | Hanne-Wiame | 406/94 |
| 3,206,255 | A | * | 9/1965 | Gray | B65G 53/00 406/144 |
| 3,295,895 | A | * | 1/1967 | Latham, Jr. | 406/125 |
| 3,380,780 | A | * | 4/1968 | Allen et al. | 406/50 |
| 3,490,654 | A | * | 1/1970 | Fischer | 406/123 |
| 4,023,280 | A | * | 5/1977 | Schora et al. | 34/364 |
| 4,239,827 | A | * | 12/1980 | Notaro | 428/34.5 |

(Continued)

FOREIGN PATENT DOCUMENTS

| EP | 0718234 A2 | 6/1996 |
| EP | 1044904 A1 | 10/2000 |

(Continued)

OTHER PUBLICATIONS

Fluid-Air Products Inc., InvisiPac Powerpoint Presentation, Jan. 5, 2013. (12 pages).

(Continued)

*Primary Examiner* — Joseph Dillon, Jr.
(74) *Attorney, Agent, or Firm* — Baker & Hostetler LLP

(57) ABSTRACT

A transfer pump for moving pellets of adhesive includes a pump housing with an adhesive inlet coupled to a supply hopper, an adhesive outlet coupled to an outlet hose, and an adhesive passage extending between the adhesive inlet and the adhesive outlet. A first air nozzle communicates with the adhesive passage adjacent the adhesive inlet and expels a first air jet that pushes pellets of adhesive through the adhesive passage. A second air nozzle communicates with the adhesive passage between the adhesive inlet and the adhesive outlet and expels a plurality of second air jets that draw pellets of adhesive through the adhesive passage by a vacuum force. The first and second air nozzles prevent clogging of pellets in the adhesive passage and enable movement of larger pellets than either air nozzle individually.

14 Claims, 6 Drawing Sheets

(56) References Cited

U.S. PATENT DOCUMENTS

| | | |
|---|---|---|
| 4,371,096 A | 2/1983 | Scholl et al. |
| 4,387,852 A | 6/1983 | Mattson et al. |
| 4,487,365 A | 12/1984 | Sperber |
| 4,583,885 A | 4/1986 | Thiele |
| 4,628,644 A | 12/1986 | Somers |
| 4,659,293 A | 4/1987 | Evenson |
| 4,704,989 A * | 11/1987 | Rosenfeld .................. 119/173 |
| 4,919,308 A | 4/1990 | Majkrzak |
| 5,006,018 A | 4/1991 | Depew |
| 5,006,019 A | 4/1991 | Dziedzic, Jr. et al. |
| 5,161,473 A * | 11/1992 | Landphair ............. A01C 7/081 111/174 |
| 5,244,019 A | 9/1993 | Derby |
| 5,318,198 A | 6/1994 | Micek et al. |
| 5,378,089 A | 1/1995 | Law |
| 5,791,830 A | 8/1998 | Fort et al. |
| 5,868,319 A | 2/1999 | Gilmore |
| 5,909,829 A | 6/1999 | Wegman et al. |
| 6,039,513 A | 3/2000 | Law |
| 6,095,803 A | 8/2000 | Slater |
| 6,352,173 B1 | 3/2002 | Duckworth |
| 6,371,174 B1 | 4/2002 | Zook et al. |
| 6,378,782 B1 | 4/2002 | Craine et al. |
| 6,892,909 B1 | 5/2005 | Hebert et al. |
| 7,144,204 B2 * | 12/2006 | Hilgraf ............................ 406/95 |
| 7,284,679 B2 * | 10/2007 | Zill ........................ B65B 1/16 222/1 |
| 7,311,474 B1 | 12/2007 | Ogasahara et al. |
| 7,329,071 B2 * | 2/2008 | Sonnichsen .................... 406/89 |
| 7,413,388 B2 * | 8/2008 | Krebs .............................. 406/55 |
| 7,626,143 B2 | 12/2009 | Miller |
| 7,798,749 B2 | 9/2010 | Charhut et al. |
| 8,573,895 B2 * | 11/2013 | Hilgraf et al. .................. 406/56 |
| 8,985,391 B2 * | 3/2015 | Ross ....................... B29B 13/022 222/1 |
| 2005/0274740 A1 | 12/2005 | Duckworth et al. |
| 2007/0080157 A1 | 4/2007 | Mehaffy et al. |
| 2009/0095730 A1 * | 4/2009 | Ganzer et al. ................. 219/421 |
| 2010/0255975 A1 | 10/2010 | Mauchle et al. |
| 2011/0210185 A1 | 9/2011 | Lundstrom et al. |
| 2013/0105526 A1 | 5/2013 | Ross et al. |
| 2013/0112312 A1 | 5/2013 | Ross et al. |
| 2013/0115016 A1 | 5/2013 | Ross et al. |
| 2014/0116514 A1 * | 5/2014 | Tix .......................... B29B 13/02 137/1 |

FOREIGN PATENT DOCUMENTS

| | | |
|---|---|---|
| EP | 1350743 B1 | 6/2006 |
| EP | 1772196 A1 | 4/2007 |
| FR | 2787770 A1 | 6/2000 |

OTHER PUBLICATIONS

Nordson Corporation, "Fillmaster™ Adhesive Feed System," PKL-02-2833 (Sep. 2002) (2 pages).

National Search & Chemical, "Installation, Operation & Maintenance Manual 3D Melt Tank Loader," Version 1.3 (undated) (22 pages).

WBH Technologies e.K, "Fordersystem Slimline auf Nordson 3100," (undated) (2 pages).

WBH Technologies e.K., "Operating Manual Conveyor System Slimline," (Jul. 2009) (8 pages).

Nordson Corporation, "Pneumatic Fill System Instruction Sheet," Publication No. 108 805A, Instruction Sheet 46-238 (1994) (27 pages).

Nordson Corporation, "Adhesives and Sealants Equipment Guide," Publication No. 237 481C (2001) (12 pages).

Nordson Corporation, "1994 Adhesives and Sealants Equipment Catalog," pp. 12-13 through 12-15 (1994) (5 pages).

Nordson Corporation, "1994 Adhesives and Sealants Equipment Catalog," pp. 1-74 through 1-75 (1994) (4 pages).

Nordson Corporation, "1996 Adhesives and Sealants Equipment Catalog," pp. 13-13, 13-14, 13-16, 13-18 and 13-19 (1996) (7 pages).

* cited by examiner

PNEUMATIC SOLIDS TRANSFER PUMP

CROSS-REFERENCE TO RELATED APPLICATION

This application claims the benefit of U.S. Provisional Patent Application Ser. No. 61/637,986, filed on Apr. 25, 2012, the disclosure of which is incorporated by reference herein in its entirety.

FIELD OF THE INVENTION

The present invention generally relates to a transfer pump for solid materials and more particularly, to a transfer pump for moving adhesive pellets from a supply hopper to an adhesive melter.

BACKGROUND

In adhesive dispensing systems, a dispensing module is generally fed liquid adhesive material from an adhesive melter or another similar supply device. These adhesive melters receive a controlled supply of solid adhesive material in the form of pellets from a supply hopper or some other storage unit. In this regard, transfer pumps for solid materials are used to control the supply of pellets of adhesive from the supply hopper to the adhesive melter. More particularly, transfer pumps remove pellets of adhesive from the supply hopper and force the pellets of adhesive with pressurized air through an outlet hose and to the adhesive melter, where the pellets of adhesive are melted to a liquid state for delivery to the dispensing module. The pellets of adhesive utilized in these adhesive dispensing systems have various shapes and sizes, but conventional transfer pumps are limited in what size and shape of pellets can be moved through the outlet hose to the adhesive melter.

In one example of a transfer pump known as a Venturi pump, the transfer pump expels one or more air jets through a passage to form a vacuum force that draws pellets of adhesive from the supply hopper and through the transfer pump. However, Venturi pumps are generally limited to creating a vacuum force of up to one atmosphere, thereby limiting the size of pellets that may be effectively drawn through the transfer pump. Additionally, the passage through which the air jets are expelled must be designed with a narrowed throat portion carefully tailored to maximize the vacuum force produced by the Venturi pump. The diameter of this narrowed throat portion may constrict or clog flow of pellets of adhesive through the transfer pump, thereby limiting the maximum size of pellets of adhesive that are moveable with the air jets.

In another example of a transfer pump known as a gravity eductor, the transfer pump expels an air jet to push pellets of adhesive from an inlet of the transfer pump and through the transfer pump. The pellets of adhesive are gravity fed into the inlet of the transfer pump by the supply hopper. Although the force exerted by the air jet in a gravity eductor can move a large number of larger pellets of adhesive, the resultant higher density of material within the transfer pump may clog the transfer pump, especially when the air jet is stopped and then restarted. As a result, gravity eductor transfer pumps cannot be stopped during operation unless the supply hopper feeding the gravity eductor is empty or the supply hopper includes additional valve structure for cutting off the gravity feed of pellets into the transfer pump. This additional valve structure is expensive and complicated, so most gravity eductors do not include the valve structure and are thus not stopped until the supply hopper is empty.

Consequently, it would be desirable to address these and other concerns associated with conventional transfer pumps.

SUMMARY OF THE INVENTION

In one embodiment of the current invention, a transfer pump is configured to move pellets of adhesive from a supply hopper to an adhesive melter. The transfer pump includes a pump housing with an adhesive inlet configured to receive pellets of adhesive from the supply hopper, an adhesive outlet configured to be coupled to an outlet hose leading to the adhesive melter, and an adhesive passage extending between the adhesive inlet and the adhesive outlet. The adhesive passage defines a passage axis and a passage periphery. The transfer pump also includes a first air nozzle communicating with the adhesive passage adjacent the adhesive inlet. The first air nozzle is configured to expel a first air jet in a direction generally along the passage axis to push pellets of adhesive through the adhesive passage. The transfer pump further includes a second air nozzle communicating with the adhesive passage between the adhesive inlet and the adhesive outlet. The second air nozzle is configured to expel a plurality of second air jets in a direction generally along the passage periphery to generate a vacuum force at the adhesive inlet that draws pellets of adhesive through the adhesive passage.

In one aspect, the adhesive inlet receives pellets of adhesive by gravity feed from the supply hopper. As a result, the first air nozzle operates as a gravity eductor for transferring pellets of adhesive to the adhesive outlet. In another aspect, the adhesive passage includes a throat portion with a narrowing inner diameter, and the plurality of second air jets is directed generally tangential to the throat portion. Consequently, the second air nozzle operates as a Venturi pump for transferring pellets of adhesive to the adhesive outlet.

In some embodiments, the transfer pump includes a controller operable to control air supplied to each of the first and second air nozzles. The controller operates the first air nozzle to force pellets of adhesive out of the adhesive inlet to prevent the pellets from clogging the adhesive inlet. The controller also operates the second air nozzle to throttle a flow of the pellets through the adhesive passage to prevent the pellets from clogging the adhesive passage or the outlet hose. When the transfer pump is to be stopped, the controller stops air flow to the first air nozzle and continues to supply air flow to the second air nozzle for a period of time after stopping air flow to the first air nozzle. The second air nozzle draws any remaining pellets of adhesive in the pump housing away from the adhesive inlet, and then the controller stops air flow to the second air nozzle.

The supply hopper and the pump housing collectively define a device footprint with a device depth. The pump housing is arranged such that the passage axis is angled from a horizontal direction, thereby reducing the device depth and minimizing the device footprint.

In another embodiment of the invention, a method for transferring solid pellets of adhesive from a supply hopper to an adhesive melter includes receiving the pellets of adhesive into an adhesive inlet of a pump housing. The pump housing also includes an adhesive outlet and an adhesive passage defining a passage axis and a passage periphery. The method also includes discharging a first air jet from a first air nozzle positioned adjacent the adhesive inlet. The first air jet is directed generally along the passage axis to push the pellets of adhesive from the adhesive inlet through the adhesive passage. The method further includes discharging a plurality of second air jets from a second air nozzle positioned between the adhesive inlet and the adhesive outlet. The plurality of second air jets is directed generally along the passage periphery to generate a vacuum force at the adhesive inlet and draw the pellets of adhesive through the adhesive passage.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the invention.

DETAILED DESCRIPTION OF THE ILLUSTRATIVE EMBODIMENTS

Figure 1:
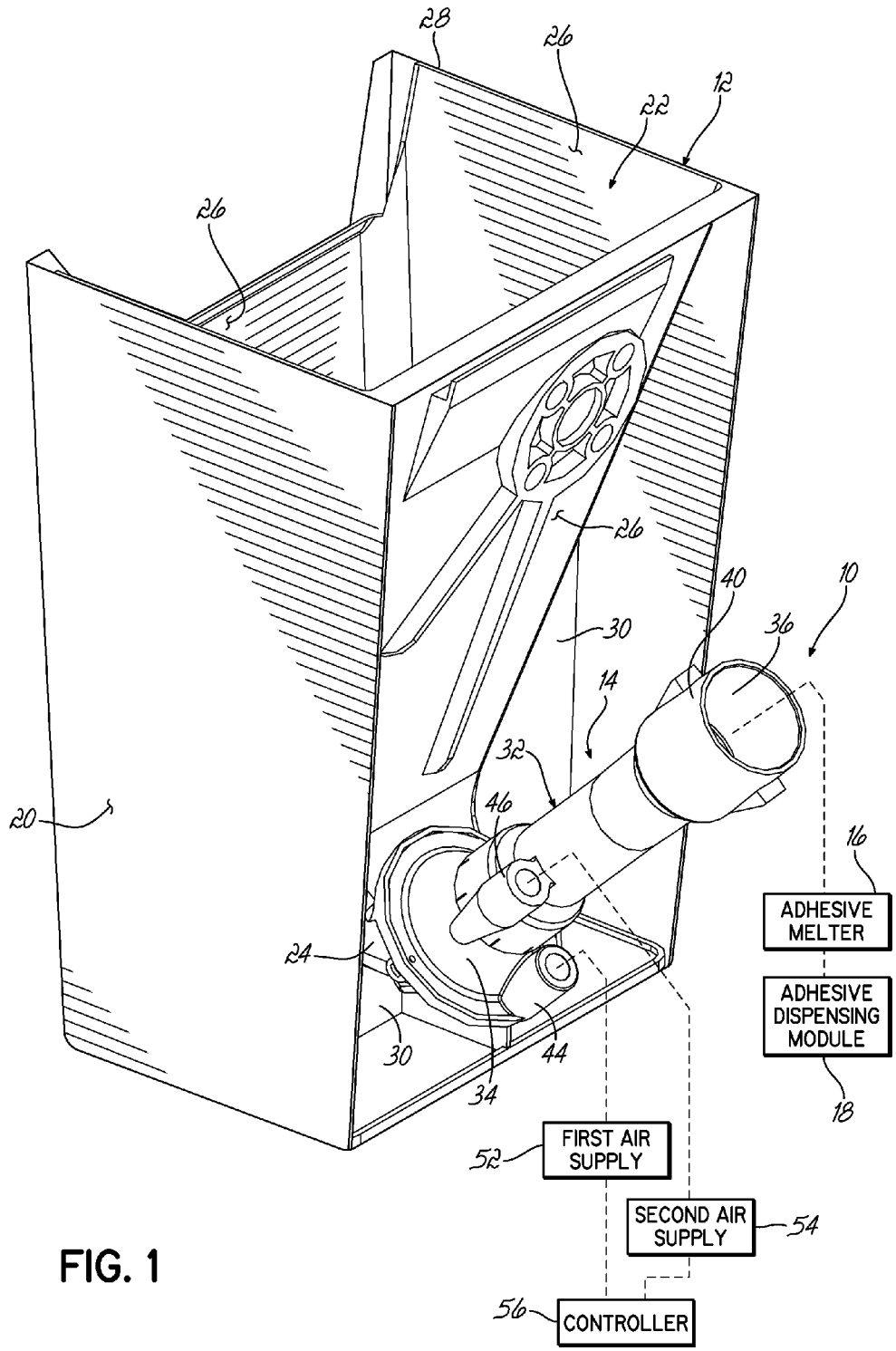
FIG. 1 is a perspective view of an adhesive dispensing system including a supply hopper and a transfer pump.

FIGS. 1-6 illustrate an adhesive dispensing system 10 including a supply hopper 12 and a pneumatic solids transfer pump 14 according to one embodiment of the current invention. As shown in FIG. 1, the transfer pump 14 is configured to move solid pellets of adhesive (not shown) or another solid material from the supply hopper 12 into an adhesive melter 16. The solid material may define any form or shape that is convenient for delivering and melting by the adhesive melter 16; however pellets have been chosen for illustrative purposes in the illustrated embodiment. After the solid pellets of adhesive are melted by the adhesive melter 16, the now-liquefied adhesive is applied to a substrate by an adhesive dispensing module 18 as well understood in the dispensing art. As a result, the transfer pump 14 assists in controlling the amount of adhesive delivered to the adhesive melter 16 and to the adhesive dispensing module 18. As described in further detail below, the transfer pump 14 advantageously includes two air nozzles that collectively operate to move larger pellets of adhesive to the adhesive melter 16 than either air nozzle would individually.

Figure 2:
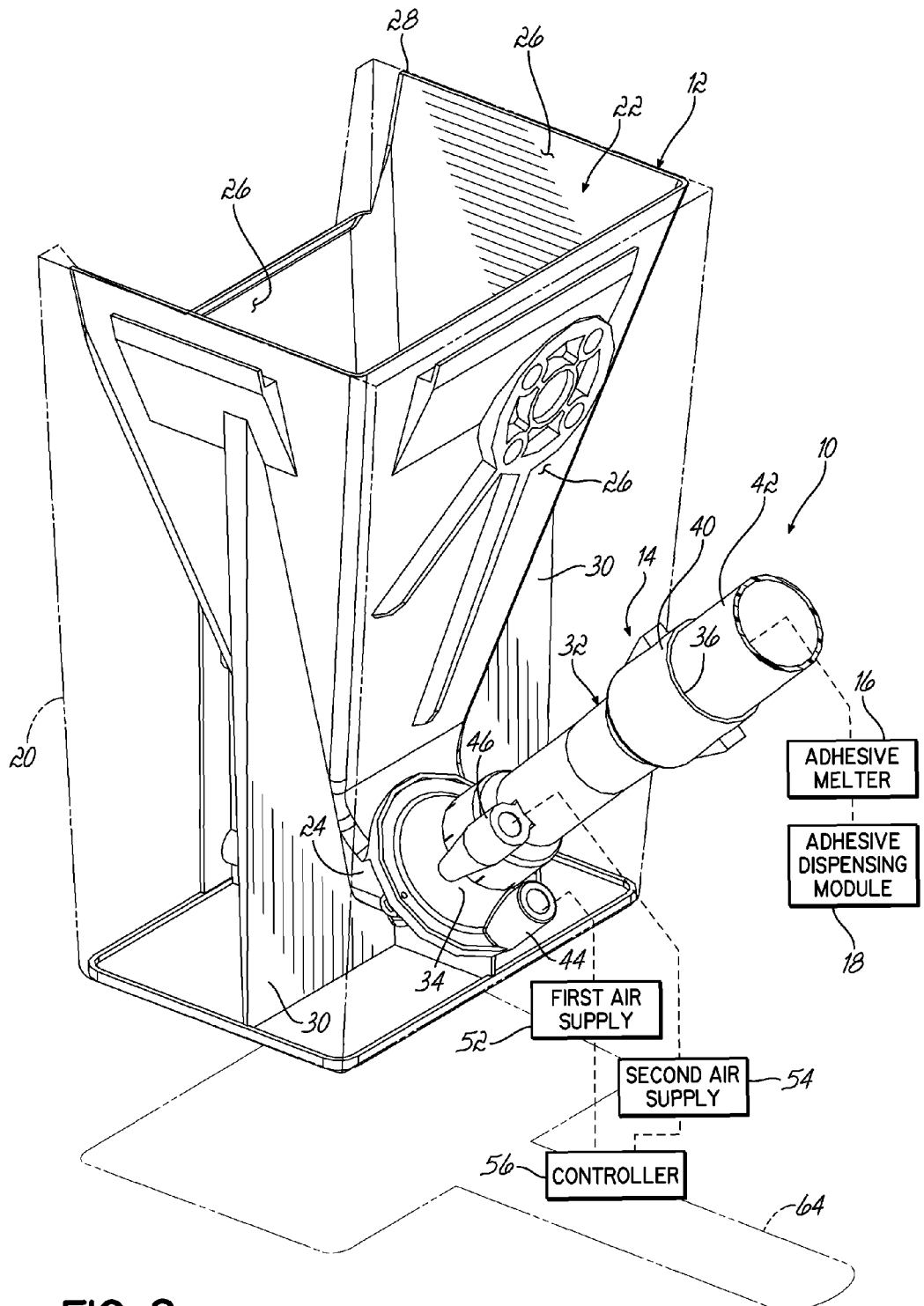
FIG. 2 is a perspective view of the supply hopper and transfer pump of FIG. 1 with the device housing shown in phantom.

With reference to FIGS. 1 and 2, the supply hopper 12 and the transfer pump 14 are partially contained within a device housing 20 of desirable shape and properties. For example, the device housing 20 as shown is generally a rectilinear box that may isolate portions of the supply hopper 12 and the transfer pump 14 from environmental interference. It would be understood that other configurations of the device housing 20 are possible in other embodiments within the scope of the invention. By way of example, the device housing 20 may include handles, wheels, a lid, or any other combination of features intended to enhance the operation of the supply hopper 12 and the transfer pump 14.

FIG. 2 shows a view of the supply hopper 12 and the transfer pump 14 with portions of the device housing 20 shown in phantom. More particularly, the supply hopper 12 includes a funnel portion 22 and a collector portion 24 extending between the funnel portion 22 and the transfer pump 14. The funnel portion 22 is defined by a plurality of hopper sidewalls 26 (four shown in the exemplary embodiment) each tapering inwardly towards the collector portion 24. Thus, pellets of adhesive (not shown) are fed by gravity from a hopper opening 28 at the top of the funnel portion 22 into the collector portion 24 and the transfer pump 14. It will be understood that the supply hopper 12 may be modified in other embodiments to gravity feed a metered supply of pellets of adhesive. The collector portion 24 defines a curved profile between the hopper portion 22 and the transfer pump 14 for reasons set forth in greater detail below. As shown in FIG. 2, the device housing 20 of the exemplary embodiment also includes support ribs 30 for maintaining the supply hopper 12 in position within the device housing 20. It will be appreciated that these support ribs 30 may be omitted in other embodiments, and the overall shape of the supply hopper 12 may also be modified in other embodiments consistent with the scope of the invention.

Figure 3:
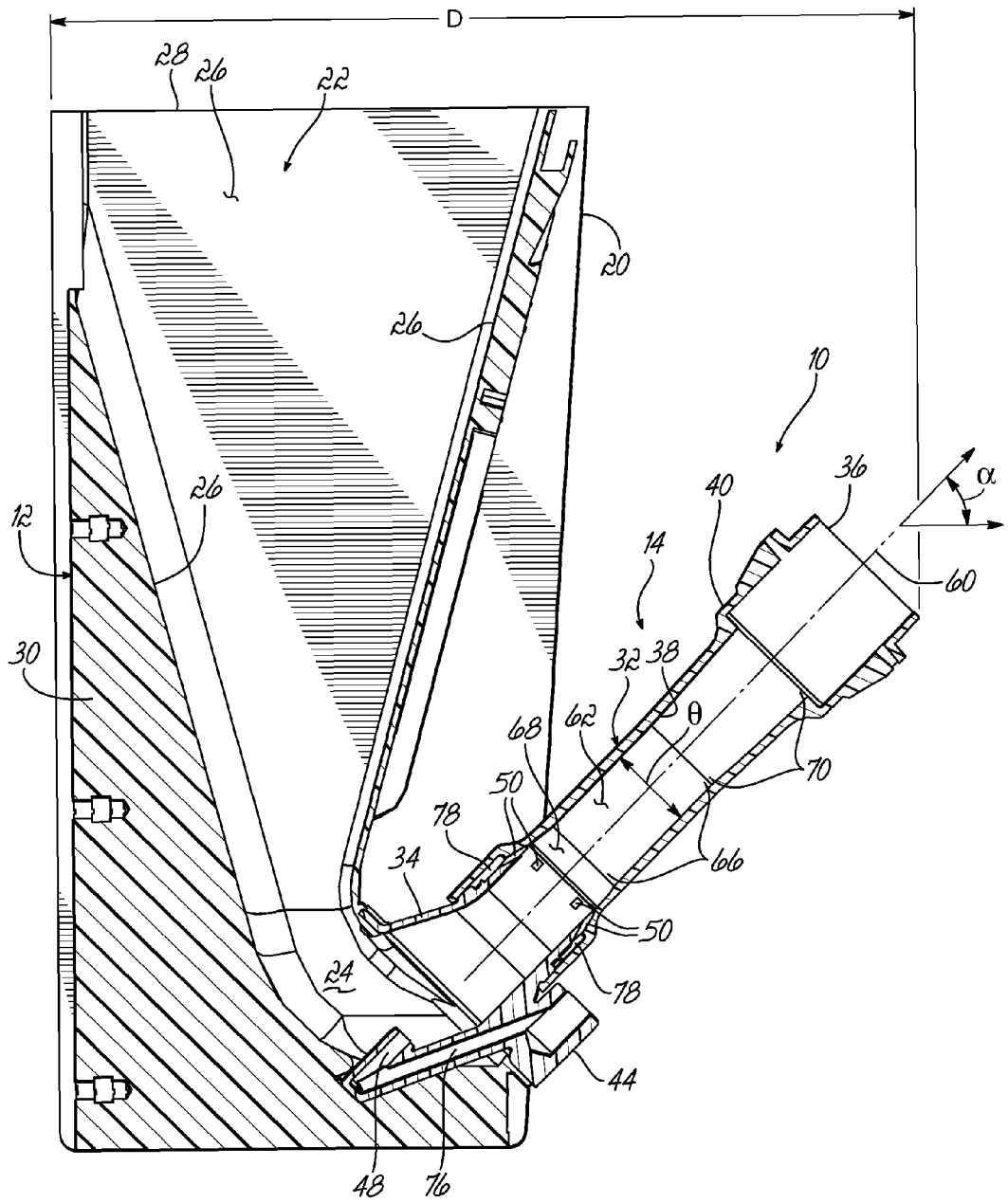
FIG. 3 is a cross-sectional side view of the supply hopper and transfer pump of FIG. 1 along line 3-3, with the supply hopper empty.

With continued reference to FIGS. 2 and 3, the transfer pump 14 includes a pump housing 32. The pump housing 32 further includes an adhesive inlet 34, an adhesive outlet 36, and an adhesive passage 38 extending between the adhesive inlet 34 and the adhesive outlet 36. The adhesive inlet 34 is coupled to the supply hopper 12 at the collector portion 24 for gravity feeding the pellets into the pump housing 32. The adhesive outlet 36 defines a connection socket 40 configured to receive an outlet hose 42 leading to the adhesive melter 16. The transfer pump 14 therefore actuates movement of pellets of adhesive from the adhesive inlet 34 through the adhesive passage 38, the adhesive outlet 36, and the outlet hose 42 to the adhesive melter 16 during operation of the transfer pump 14. The pump housing 32 also includes a first air inlet port 44 and a second air inlet port 46 operatively connected to corresponding first and second air nozzles 48, 50 as described in further detail below. The first air inlet port 44 is connected to a first pressurized air supply 52 and the second air inlet port 46 is connected to a second pressurized air supply 54 as shown in FIG. 2. It will be understood that the first and second pressurized air supplies 52, 54 may be a single pressurized air source in some embodiments of the invention. The transfer pump 14 also includes a controller 56 for controlling the air flow delivered to each of the first and second air inlet ports 44, 46 from the first and second pressurized air supplies 52, 54.

The adhesive passage 38 is more clearly shown in FIG. 3. In this regard, the adhesive passage 38 defines a passage axis 60 and a passage periphery 62 surrounding the passage axis 60. As described above, the collector portion 24 of the supply hopper 12 has a curved profile so that the passage axis 60 is angled upwardly from a horizontal orientation by an angle α. As a result, a total device depth D defined by the supply hopper 12 and the transfer pump 14 is reduced from what the depth D would be if the passage axis 60 were horizontal. To this end, a device footprint 64 (shown in FIG. 2) defined by the supply hopper 12 and the transfer pump 14 is minimized by angling the transfer pump 14 and the passage axis 60 upwardly. It will be understood that the device depth D and the device footprint 64 may be modified by changing the angle α without departing from the scope of the invention, but minimizing the device footprint 64 is generally desirable to save space in working environments.

With continued reference to FIG. 3, the adhesive inlet 34 of the pump housing 32 tapers inwardly towards the adhesive passage 38 to collect pellets of adhesive fed through the collector portion 24 of the supply hopper 12. The first air nozzle 48 is located just upstream of the adhesive inlet 34 within the collector portion 24 for pushing pellets of adhesive into and through the adhesive passage 38. The adhesive passage 38 further includes a throat portion 66 in which the passage periphery 62 has a narrowed inner diameter θ from the remainder of the adhesive passage 38. In order to avoid the formation of sharp shoulders where pellets of adhesive could catch during movement through the transfer pump 14, the throat portion 66 is bounded by a converging portion 68 facing towards the adhesive inlet 34 and a diverging portion 70 facing towards the adhesive outlet 70. The throat portion 66 reduces the pressure of air flow through the pump housing 32 to assist with the formation of a vacuum force as described in further detail below. The second air nozzle 50 is located between the adhesive inlet 34 and the adhesive outlet 38, and more particularly, between the adhesive inlet 34 and the converging portion 68. The diverging portion 70 is shown extending all the way from the throat portion 66 to the connection outlet 40 for the outlet hose 42, although it will be understood that the diverging portion 70 may be shortened in length in other embodiments consistent with the scope of the invention.

It will be understood that each of the first and second air nozzles 48, 50 inherently generates a vacuum force upstream of the air nozzles 48, 50 when pressurized air is discharged from the air nozzles 48, 50 to move pellets of adhesive as described in further detail below. In order to move larger pellets of adhesive through the transfer pump 14, the narrowed inner diameter θ of the throat portion 66 must be enlarged to prevent constriction or clogging of pellets in that throat portion 66. However, as the narrowed inner diameter θ is enlarged from an ideal Venturi size to approach the larger diameters of the adhesive passage 38 at the converging portion 68 and the diverging portion 70, the vacuum force that can be generated by the second air nozzle 50 is reduced significantly. As a result, increasing the size of the throat portion 66 reduces the ability of the second air nozzle 50 to move pellets of adhesive. Thus, the transfer pump 14 advantageously includes the first air nozzle 48 to overcome the reduction in vacuum force produced by the second air nozzle 50 when the throat portion 66 includes a larger diameter θ as shown in FIG. 3.

Figure 4:
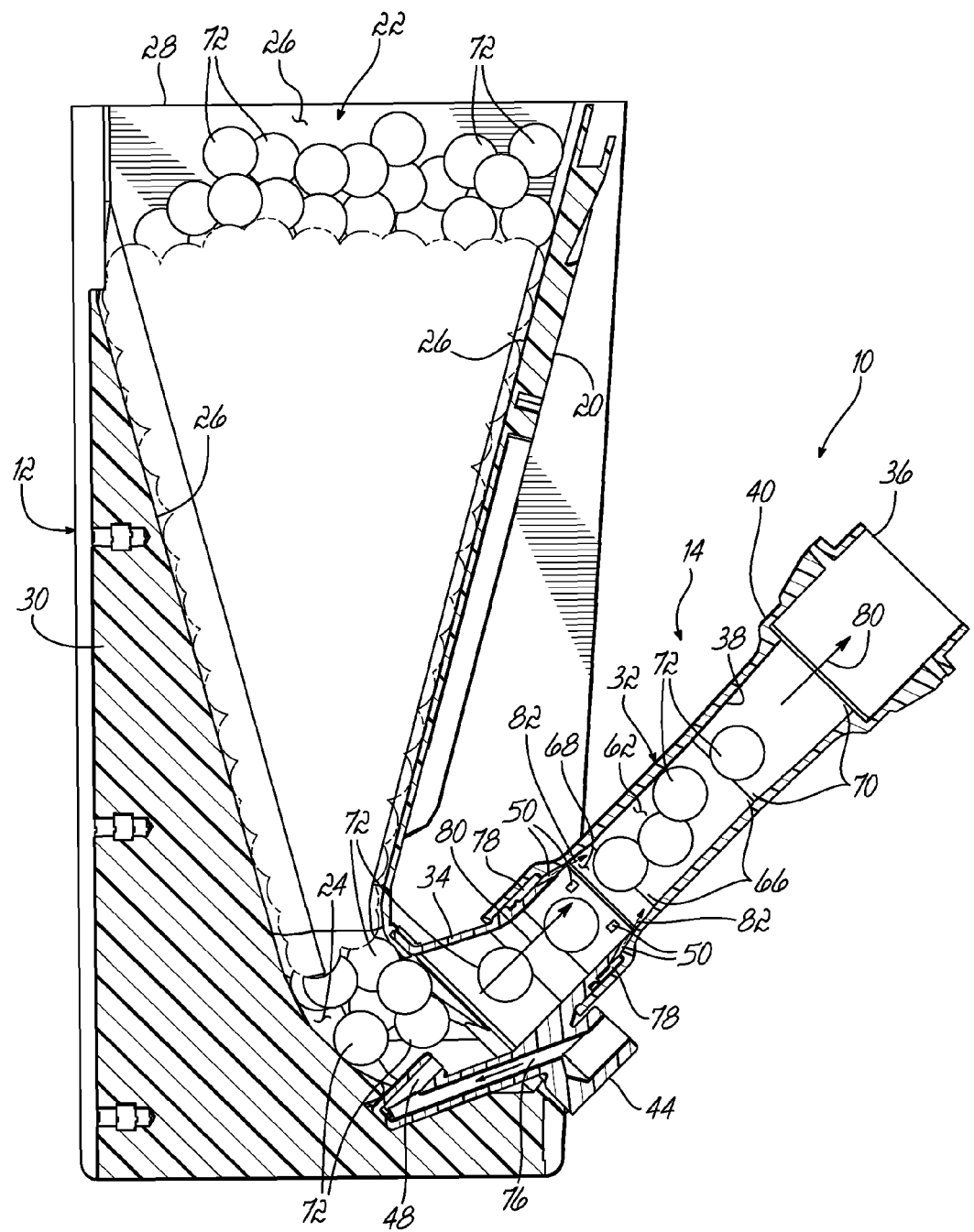
FIG. 4 is a cross-sectional side view of the supply hopper and transfer pump of FIG. 3, with the transfer pump moving pea-shaped pellets of adhesive from the supply hopper in a first operational state.
Figure 5:
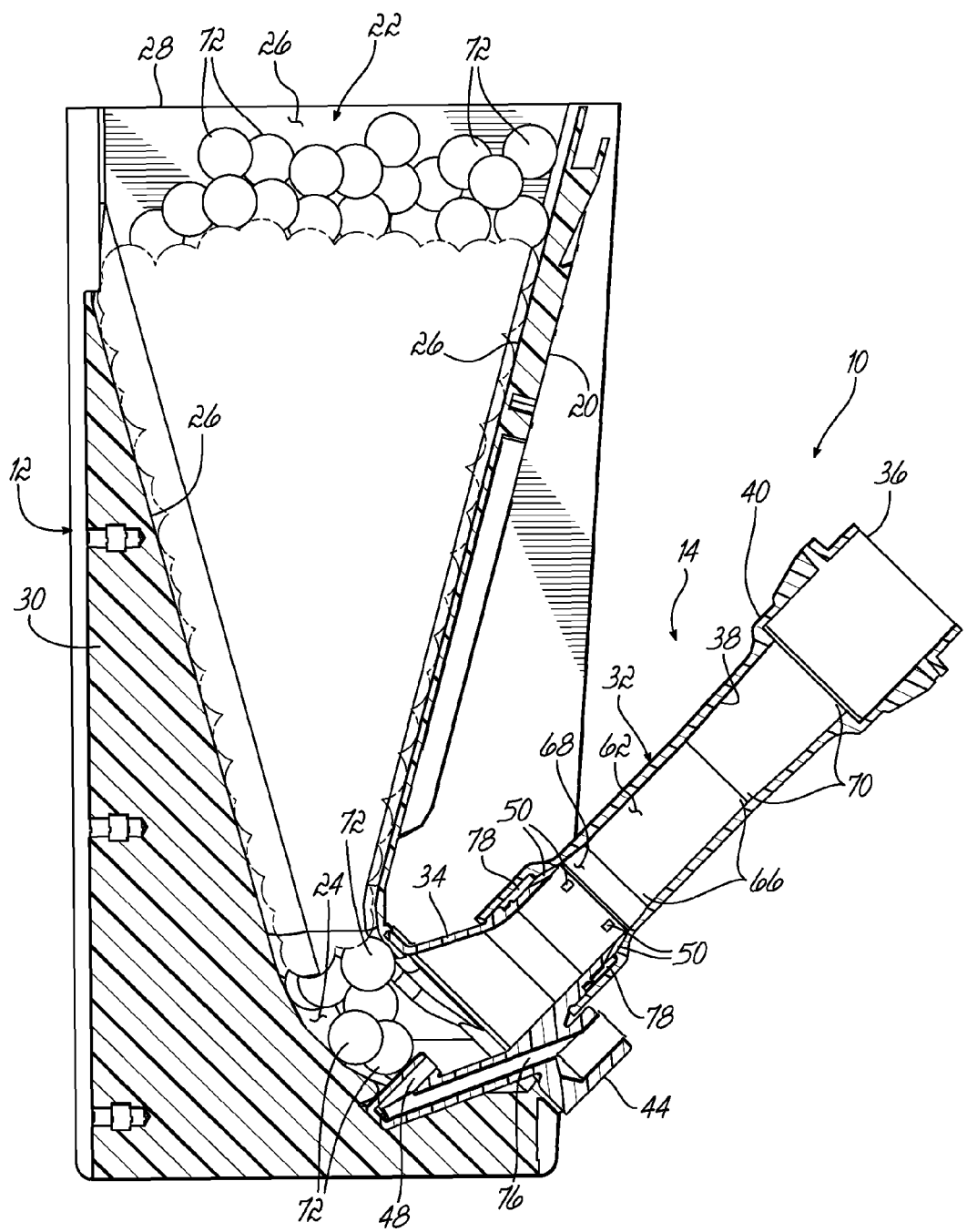
FIG. 5 is a cross-sectional side view of the supply hopper and transfer pump of FIG. 4, with the transfer pump removing pea-shaped pellets of adhesive from the transfer pump in a second operational state.
Figure 6:
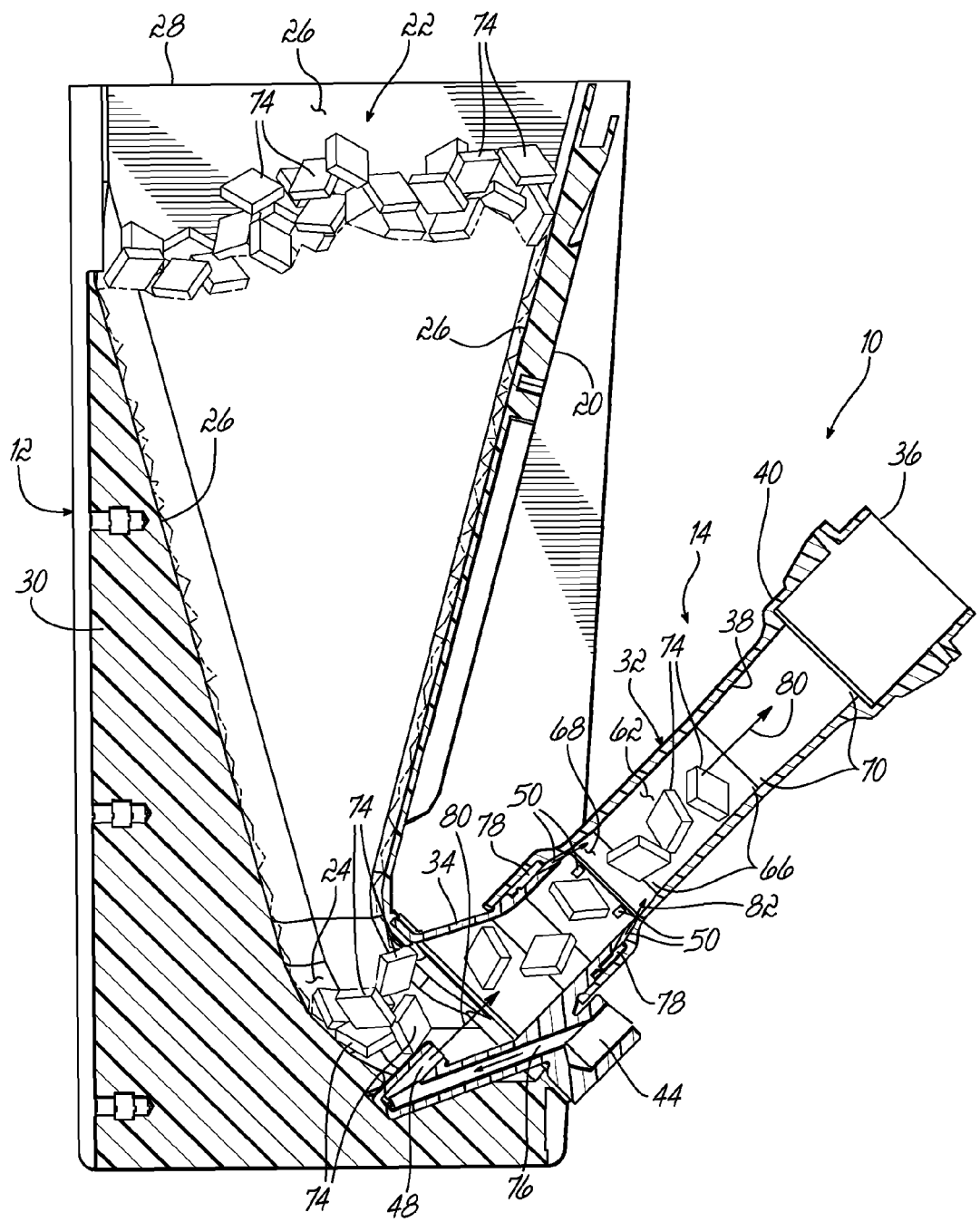
FIG. 6 is a cross-sectional side view of the supply hopper and transfer pump of FIG. 3, with the transfer pump moving slat-shaped pellets of adhesive from the supply hopper in a first operational state.

Turning to FIGS. 4-6, the transfer pump 14 is shown in operation with two different types of pellets 72, 74 of adhesive. The pellets 72, 74 are propelled through the adhesive inlet 34 and the adhesive passage 38 by pneumatic forces formed by air flow expelled by the first air nozzle 48 and the second air nozzle 50. As described above, the first air nozzle 48 and the second air nozzle 50 receive pressurized air from the first air supply 52 and second air supply 54, respectively. In this regard, the pump housing 32 includes a first air passage 76 extending between the first air nozzle 48 and the first air inlet port 44 to deliver air from the first air supply 52 to the first air nozzle 48 when the first air nozzle 48 is active. Similarly, the pump housing 32 also includes a second air passage 78 in the form of an annular air chamber 78 extending between the second air nozzle 50 and the second air inlet port 46 to deliver air from the second air supply 54 to the second air nozzle 50 when the second air nozzle 50 is active.

The pellets 72 of adhesive shown in FIGS. 4 and 5 define a spherical or pea-shape, which is generally easier to move with pneumatic force because the pea shape always presents a relatively large surface area for pressurized air to apply force to the pellet 72. The rounded pea shape of the pellets 72 also do not lead to stacking or catching of the pellets 72 within the adhesive passage 38. FIG. 4 shows the transfer pump 14 during normal operation with the first air nozzle 48 and the second air nozzle 50 both active for moving the pellets 72 through the adhesive passage 38 and the outlet hose 42. The first air nozzle 48 is arranged to expel a first air jet as shown by arrows 80 along the passage axis 60 similar to a gravity eductor. In this regard, the first air nozzle 48 is capable of forming positive pressure to push gravity fed pellets 72 out of the adhesive inlet 34 and through the adhesive passage 38. The first air nozzle 48 also effectively generates a vacuum force upstream of the first air nozzle 48 to draw pellets 72 from the adhesive inlet 34.

Concurrently, the second air nozzle 50 expels a plurality of second air jets indicated by arrows 82 generally along the passage periphery 62 and, more particularly, generally tangential to the throat portion 66 at the converging portion 68. Because the throat portion 66 is narrower than the adhesive inlet 34, the pellets 72 are subject to a Venturi effect in which the pressure of the air flow is lower in the throat portion 66 than at the adhesive inlet 34. This pressure differential produces a vacuum force at the adhesive inlet 34 similar to a Venturi pump and therefore applies additional force to draw pellets 72 from the adhesive inlet 34 and through the adhesive passage 38. Under the influence of the additive pressures of the first air nozzle 48 and the second air nozzle 50, the pellets 72 travel through the transfer pump 14 and the outlet hose 42 at an upward angle α. To this end, the combined forces generated by the first air nozzle 48 and the second air nozzle 50 reliably actuates movement of larger pellets 72 from the adhesive inlet 34 and through the adhesive passage 38 than either of the air nozzles 48, 50 could move individually.

In the normal operational state shown in FIG. 4, pellets 72 are fed by gravity from the supply hopper 12 into the adhesive inlet 34, at which point a combined pushing force from the first air jet expelled by the first air nozzle 48 and a drawing force from the plurality of second air jets expelled by the second air nozzle 50 cooperate to move these pellets 72 through the adhesive passage 38 and the outlet hose 42. The combination of a pushing force from the first air nozzle 48 and a drawing force from the second air nozzle 50 collectively enables the transfer pump 14 to reliably move relatively large pellets 72 to the adhesive melter 16 while avoiding clogging at any portion of the transfer pump 14 or the outlet hose 42. To this end, the first air jet from the first air nozzle 48 directly forces pellets 72 out of the adhesive inlet 34 as the pellets 72 fall from the supply hopper 12, thereby preventing clogging of the adhesive inlet 34 with pellets 72. The plurality of second air jets from the second air nozzle 50 operates to throttle a flow of the pellets 72 through the adhesive passage 38, which prevents the pellets 72 from clogging the adhesive passage 38 or the outlet hose 42.

In the illustrated embodiment, the first air supply 52 and the second air supply 54 are separate and independently controlled by the controller 56. In this regard, the controller 56 operates to set a flow rate of air expelled from each of the first and second air nozzles 48, 50 depending upon the particular type and size of pellet 72 to be moved by the transfer pump 14. However, it will be appreciated that such control effects may also be achieved with multiple valves or similarly capable hardware at the pump housing 32 in other embodiments within the scope of the invention. The controller 56 therefore operates the first and second air nozzles 48, 50 to transfer the pellets 72 without causing clogging as described above.

For example, a typical inner diameter of the outlet hose 42 in the adhesive dispensing setting is about 32 millimeters. The hybrid pushing and drawing forces applied by the transfer pump 14 advantageously enable reliable transfer of pellets 72 having a largest dimension (e.g., diameter for a spheroid) of up to 15 millimeters without clogging or other failure. By contrast, conventional transfer pumps of the same size as described in the background above cannot reliably transfer pellets having a largest dimension above 12 millimeters. In this regard, a conventional transfer pump has proven to clog or fail with 15 millimeter pellets at a rate of about 1 out of every 35 cycles, while the transfer pump 14 of the current invention successfully transferred 15 millimeter pellets for over 250 successive cycles without failure. Thus, the transfer pump 14 unexpectedly improves the size of pellets 72 that may be reliably transferred from the supply hopper 12 to the adhesive melter 16.

Moreover, the independent control of the first air nozzle 48 and the second air nozzle 50 by the controller 56 also provides additional benefits. More specifically, the transfer pump 14 of the current invention reduces clogging caused by pellets 72 settling within the pump housing 32 between operational cycles of the transfer pump 14. For instance, the transfer pump 14 may require a shutdown before the supply hopper 12 is emptied of pellets 72. In such a situation, the pellets 72 located in the supply hopper 12 continue to fall by the force of gravity into the collector portion 24 and into the adhesive inlet 34. If these pellets 72 remain stagnant at this location, especially in warm operating environments, the pellets 72 may begin to stick together and clog the adhesive inlet 34. However, the controller 56 is configured to avoid this stagnant collection of pellets 72 in the pump housing 32 by running the second air nozzle 50 after shutting off the first air nozzle 48.

In this regard, the controller 56 stops air flow to the first air nozzle 48 to stop pushing pellets 72 from the collector portion 24 and the adhesive inlet 34. The controller 56 continues to supply air flow to the second air nozzle 50 for a period of time after stopping air flow to the first air nozzle 48. The plurality of second air jets from the second air nozzle 50 continues to draw the pellets present within the pump housing 32 through the adhesive passage 38 and the outlet hose 42. Additionally, the relatively low vacuum pressure generated by the second air nozzle 50, which is caused by the large diameter θ of the throat portion 66, does not draw additional pellets 72 from the collector portion 24 into the adhesive inlet 34. Thus, the transfer pump 14 and the outlet hose 42 are each substantially cleared of pellets 72 as shown in FIG. 5. After the second air nozzle 50 has operated alone for the period of time, which may be adjustable or predetermined by the controller 56, the air flow to the second air nozzle 50 is stopped until the transfer pump 14 is to be activated to the normal operating state again. Any small number of pellets 72 that may gather in the collector portion 24 adjacent to the adhesive inlet 34 is reliably pushed into and through the adhesive passage 38 by the first and second air nozzles 48, 50 upon the start of a new operational cycle. Consequently, the transfer pump 14 advantageously enables starting and stopping of transfer of pellets 72 before the supply hopper 12 is completely emptied.

Additionally, the transfer pump 14 is operable to reliably move pellets 72, 74 of differing shapes and sizes. FIG. 6 illustrates pellets 74 of adhesive that define a slat shape, also referred to as a thin rectangular box or prism. These slat shaped pellets 74 represent one worst case scenario because the pellets 74 may rotate to present only the thin side for the pressurized air to apply force upon; additionally, the flat sides of the slat shaped pellets 74 enables stacking of the pellets 74 at the formation of "rat holes" within the adhesive passage 38.

However, the transfer pump 14 of the current invention still reliably transfers these pellets 74 of adhesive through the adhesive passage 38 and the outlet hose 42. Similar to the pea-shape pellets 72 previously described, slat shaped pellets 74 up to at least 15 millimeters in size (e.g., along a longest side edge) are transferred by the transfer pump 14 without clogging or other failure.

As a result, the transfer pump 14 is subject to less downtime for maintenance and repairs while enabling selective control of how much solid adhesive material is delivered to the adhesive melter 16. The transfer pump 14 reliably transfers relatively large sized pellets 72, 74 in varying shapes with a minimized device footprint 64. In this regard, the transfer pump 14 of the current invention achieves numerous benefits in pneumatic powered solids transfer.

While the present invention has been illustrated by a description of an exemplary embodiment, and while this embodiment has been described in considerable detail, there is no intention to restrict, or in any way limit, the scope of the appended claims to such detail. Additional advantages and modification will readily appear to those skilled in the art. Therefore, the invention in its broadest aspects is not limited to the specific detail shown and described. The various features disclosed herein may be used in any combination necessary or desired for a particular application. Consequently, departures may be made from the details described herein without departing from the spirit and scope of the claims which follow.

What is claimed is:

1. A hot melt dispensing system comprising:

a supply hopper for storing adhesive pellets, said supply hopper including a collector portion defining a lowermost surface of said supply hopper;

a transfer pump for transporting adhesive pellets from said supply hopper, said transfer pump comprising a venturi pump including a second air nozzle for creating a low pressure zone in said transfer pump for inducing flow of adhesive pellets from said supply hopper into said transfer pump; and said transfer pump further comprising a pump housing with an adhesive inlet positioned substantially at said lowermost surface of said supply hopper and at an angle relative to a horizontal orientation of said lowermost surface; and a first air nozzle positioned with respect to said adhesive inlet of said transfer pump for applying a flow of air for agitating the adhesive pellets and moving the adhesive pellets toward said adhesive inlet, said first air nozzle comprising an outlet aimed towards said adhesive inlet of said transfer pump, wherein said outlet of said first air nozzle is positioned upstream of said adhesive inlet of said transfer pump, said pump housing further including an adhesive outlet configured to be coupled to an outlet hose leading to an adhesive melter, and an adhesive passage located between said adhesive inlet and said adhesive outlet, said adhesive passage defining a passage axis and a passage periphery;

said first air nozzle being configured to expel a first air jet in a direction generally along said passage axis to push pellets of adhesive through said adhesive passage; and said second air nozzle communicating with said adhesive passage between said adhesive inlet and said adhesive outlet, said second air nozzle configured to expel a plurality of second air jets in a direction generally along said passage periphery to draw pellets of adhesive through said adhesive passage with a vacuum force formed at said low pressure zone, wherein said supply hopper and said pump housing collectively define a device footprint including a device depth, and said passage axis is angled from a horizontal direction to reduce said device depth and thereby minimize said device footprint.

2. A hot melt dispensing system comprising:
a supply hopper for storing adhesive pellets, said supply hopper including a collector portion defining a lowermost surface of said supply hopper;
a transfer pump for transporting adhesive pellets from said supply hopper, said transfer pump comprising a venturi pump including a second air nozzle for creating a low pressure zone in said transfer pump for inducing flow of adhesive pellets from said supply hopper into said transfer pump; and said transfer pump further comprising a pump housing with an adhesive inlet positioned substantially at said lowermost surface of said supply hopper and at an angle relative to a horizontal orientation of said lowermost surface; and
a first air nozzle positioned with respect to said adhesive inlet of said transfer pump for applying a flow of air for agitating the adhesive pellets and moving the adhesive pellets toward said adhesive inlet, said first air nozzle comprising an outlet aimed towards said adhesive inlet of said transfer pump, wherein said outlet of said first air nozzle is positioned upstream of said adhesive inlet of said transfer pump.

3. The hot melt dispensing system of claim 2, further comprising:
a melter connected to said transfer pump for heating adhesive pellets into a liquid form; and
a dispenser for administering liquefied adhesive pellets from said melter.

4. The hot melt dispensing system of claim 2,
said pump housing further including an adhesive outlet configured to be coupled to an outlet hose leading to an adhesive melter, and an adhesive passage located between said adhesive inlet and said adhesive outlet, said adhesive passage defining a passage axis and a passage periphery;
said first air nozzle being configured to expel a first air jet in a direction generally along said passage axis to push pellets of adhesive through said adhesive passage; and
said second air nozzle communicating with said adhesive passage between said adhesive inlet and said adhesive outlet, said second air nozzle configured to expel a plurality of second air jets in a direction generally along said passage periphery to draw pellets of adhesive through said adhesive passage with a vacuum force formed at said low pressure zone.

5. The hot melt dispensing system of claim 4, said first air nozzle operating as a gravity eductor for transferring pellets of adhesive to said adhesive outlet.

6. The hot melt dispensing system of claim 5, said adhesive passage further including a throat portion including a narrowing inner diameter, and the plurality of second air jets is configured to be directed generally tangential to said throat portion such that said second air nozzle operates as a Venturi pump for transferring pellets of adhesive to said adhesive outlet.

7. The hot melt dispensing system of claim 4, further comprising:
a controller operatively coupled to said first and second air nozzles and operable to control air supplied to each of said first and second air nozzles.

8. The hot melt dispensing system of claim 7, wherein said controller operates said first air nozzle to force pellets of adhesive out of said adhesive inlet to prevent the pellets from clogging said adhesive inlet, and said controller operates said second air nozzle to throttle a flow of the pellets through said adhesive passage to prevent the pellets from clogging said adhesive passage or the outlet hose.

9. The hot melt dispensing system of claim 7, wherein said controller is operable to perform the following steps when operation of said transfer pump is to be stopped:
stopping air flow to said first air nozzle to stop pushing pellets of adhesive from said adhesive inlet;
continuing to supply air flow to said second air nozzle for a period of time after stopping air flow to said first air nozzle such that said second air nozzle draws any pellets of adhesive remaining in said pump housing from said adhesive inlet; and
stopping air flow to said second air nozzle to stop transfer of the pellets of adhesive to the adhesive melter.

10. The hot melt dispensing system of claim 2, wherein said first air nozzle is aligned with said adhesive inlet of said transfer pump.

11. The hot melt dispensing system of claim 10, wherein said first air nozzle comprises:
an air hose extending into said supply hopper.

12. The hot melt dispensing system of claim 10, wherein said supply hopper comprises:
a pellet inlet at a top of said supply hopper and a pellet outlet at a bottom of said supply hopper.

13. The hot melt dispensing system of claim 10, wherein a portion of said supply hopper is substantially funnel shaped.

14. The hot melt dispensing system of claim 10, further comprising:
an air source for supplying compressed air to said first air nozzle; and
an air control valve connected between said air source and said first air nozzle.

* * * * *